United States Patent
Auvenshine et al.

(10) Patent No.: US 10,528,415 B2
(45) Date of Patent: Jan. 7, 2020

(54) GUIDED TROUBLESHOOTING WITH AUTOFILTERS

(71) Applicant: International Business Machines Corporation, Armonk, NY (US)

(72) Inventors: John J. Auvenshine, Tucson, AZ (US); Nicolas A. Druet, Montreal (CA); Donald C. Laing, Midland, TX (US); Per Lutkemeyer, Lystrup (DK); Martin Proulx, Laval (CA); Laura Richardson, Tampa, FL (US); Dominic Thibodeau, Laval (CA); Stanley C. Wood, Round Rock, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 171 days.

(21) Appl. No.: 15/444,968

(22) Filed: Feb. 28, 2017

(65) Prior Publication Data

US 2018/0246776 A1    Aug. 30, 2018

(51) Int. Cl.
*G06F 11/00* (2006.01)
*G06F 11/07* (2006.01)
(Continued)

(52) U.S. Cl.
CPC ........ *G06F 11/079* (2013.01); *G06F 11/0709* (2013.01); *G06F 11/0778* (2013.01); *G06F 11/3006* (2013.01); *G06F 11/3476* (2013.01)

(58) Field of Classification Search
CPC .............. G06F 11/079; G06F 11/0709; G06F 11/0751; G06F 11/0793; G06F 11/3006; G06F 11/3476
See application file for complete search history.

(56) References Cited

U.S. PATENT DOCUMENTS 7,487,132 B2 *  2/2009  Auvenshine ............ G06F 17/30
                                                   706/15
7,721,152 B1 *  5/2010  Joshi ................... G06F 11/0709
                                                   714/15
(Continued)

FOREIGN PATENT DOCUMENTS

WO        0177883 A1    10/2001
WO        03065179 A2    8/2003

OTHER PUBLICATIONS

IBM: List of IBM Patents or Patent Applications Treated as Related, 2 pg.

(Continued)

*Primary Examiner* — Elmira Mehrmanesh
(74) *Attorney, Agent, or Firm* — Cuenot, Forsythe & Kim, LLC

(57) ABSTRACT

An indication of a problem within the computing environment can be received by a data processing system external to a computing environment. Based on the indication of the problem within the computing environment, the data processing system can select a data log filter. The data log filter can be configured to access, from each of a plurality of data logs, a respective data set comprising log entries that are candidate indicators of the problem. Each of the plurality of data logs can be generated by a respective electronic device that is a member of the computing environment. The data processing system can access the respective data sets from the plurality of data logs using the data log filter, and output each respective data set.

12 Claims, 8 Drawing Sheets

(51) Int. Cl.
*G06F 11/30* (2006.01)
*G06F 11/34* (2006.01)

(56) References Cited

U.S. PATENT DOCUMENTS

| | | | | |
|---|---|---|---|---|
| 8,024,712 | B1 | 9/2011 | Korolev et al. | |
| 8,037,077 | B2* | 10/2011 | Takahashi | G06Q 30/06 |
| | | | | 707/747 |
| 8,145,955 | B2* | 3/2012 | Satonaga | G03G 15/5075 |
| | | | | 714/48 |
| 8,938,644 | B2* | 1/2015 | Clark | G06F 11/0727 |
| | | | | 707/718 |
| 9,075,718 | B2 | 7/2015 | Hinterbichler et al. | |
| 9,098,412 | B1 | 8/2015 | Marchant et al. | |
| 10,037,375 | B2* | 7/2018 | Ben-Tzur | G06F 17/30598 |
| 2008/0065928 | A1* | 3/2008 | Suzuki | G06F 11/0709 |
| | | | | 714/3 |
| 2008/0227066 | A1* | 9/2008 | Beygelzimer | G09B 7/00 |
| | | | | 434/238 |
| 2008/0262890 | A1* | 10/2008 | Korupolu | G06F 11/0793 |
| | | | | 705/7.22 |
| 2011/0055699 | A1* | 3/2011 | Li | G06F 17/30864 |
| | | | | 715/709 |
| 2011/0130916 | A1 | 6/2011 | Mayer | |
| 2012/0131557 | A1 | 5/2012 | Davies | |
| 2013/0191516 | A1 | 7/2013 | Sears | |
| 2014/0006871 | A1* | 1/2014 | Lakshmanan | H04L 41/065 |
| | | | | 714/37 |
| 2014/0250332 | A1* | 9/2014 | Duggan | G06F 11/079 |
| | | | | 714/37 |
| 2016/0088083 | A1 | 3/2016 | Bharadwaj et al. | |
| 2018/0246777 | A1 | 8/2018 | Auvenshine | |

OTHER PUBLICATIONS

Auvenshine, J.J. et al., "Guided Troubleshooting With Autofilters", U.S. Appl. No. 15/845,258 filed Dec. 18, 2017, 35 pages.

\* cited by examiner

Problem Analyzer ~400

Issues

| Info | Check Id | Check Name | Severity | Result | Device | Device Compliance Affected? | Fail/Pass Since | Suspicion |
|---|---|---|---|---|---|---|---|---|
| △ | v7000.5.20 | Unfixed events must not be presented in error log | Major | Failed | abc_v7000_20 | Yes | 2 months | Matched the Given Description |
| △ | XYZ 5.28 | SFPs must be healthy | Medium | Failed | RTP3WWDO1 | Yes | 2 months | Matched the Given Description |

Problem Analyzer — 500

Check Details

Fail Log
Id:          v7000.5.20
Name:        Unfixed events must not be presented in error log  ← 510
Type:        match
Segment:     lseventlog_alert
Severity:    major Some lines did not pass the criteria (exluce:no)

536:1604244264243:node:1:node1:alert:no:980440::Failed to transfer file from remote node
536:1604244264243:node:1:node1:alert:no:980440::Failed to transfer file from remote node
536:1604244264243:node:1:node1:alert:no:980440::Failed to transfer file from remote node
654:1604260419252:email_server:0:emailserver0::alert:no:009150:2600:Unable to connect to the SMTP server ← 520
536:1604244264243:node:1:node1:alert:no:980440::Failed to transfer file from remote node
536:1604244264243:node:1:node1:alert:no:980440::Failed to transfer file from remote node

FIG. 5

GUIDED TROUBLESHOOTING WITH AUTOFILTERS

BACKGROUND

The present invention relates to data processing systems, and more specifically, to data processing systems used to analyze problems in computing environments.

A computing environment is a collection of computers, software and one or more networks that support processing and exchange of electronic information. Computing environments continue to become increasingly complex. For example, in addition to various types of computers, switches, modems, firewalls, etc., a computing environment may include one or more storage area networks (SAN). A SAN itself may include servers, host bus adapters (HBAs), SAN switches, virtualization devices (e.g., a SAN volume controllers (SVCs)), wide area network (WAN) communication links, storage devices (e.g., hard disk drives, solid state drives, tape drives, etc.) and storage controllers. Analyzing problems in such complex computing environments can be difficult.

SUMMARY

A system includes a processor programmed to initiate executable operations. The executable operations include receiving, by a data processing system external to a computing environment, an indication of a problem within the computing environment. The executable operations also can include, based on the indication of the problem within the computing environment, selecting by the data processing system, a data log filter configured to access, from each of a plurality of data logs, a respective data set comprising log entries that are candidate indicators of the problem, each of the plurality of data logs generated by a respective electronic device that is a member of the computing environment. The executable operations also can include accessing, by the data processing system using the selected data log filter, the respective data sets from the plurality of data logs. The executable operations also can include outputting each respective data set.

A computer program includes a computer readable storage medium having program code stored thereon. The program code is executable by a processor to perform a method. The method includes receiving, by a data processing system external to a computing environment, an indication of a problem within the computing environment. The method also can include, based on the indication of the problem within the computing environment, selecting by the data processing system, a data log filter configured to access, from each of a plurality of data logs, a respective data set comprising log entries that are candidate indicators of the problem, each of the plurality of data logs generated by a respective electronic device that is a member of the computing environment. The method also can include accessing, by the data processing system using the selected data log filter, the respective data sets from the plurality of data logs. The method also can include outputting, by the data processing system, each respective data set.

BRIEF DESCRIPTION OF THE DRAWINGS

FIG. 4 is another example of a view presented in the user interface by the data processing system.

FIG. 5 is another example of a view presented in the user interface by the data processing system.

DETAILED DESCRIPTION

Figure 1:
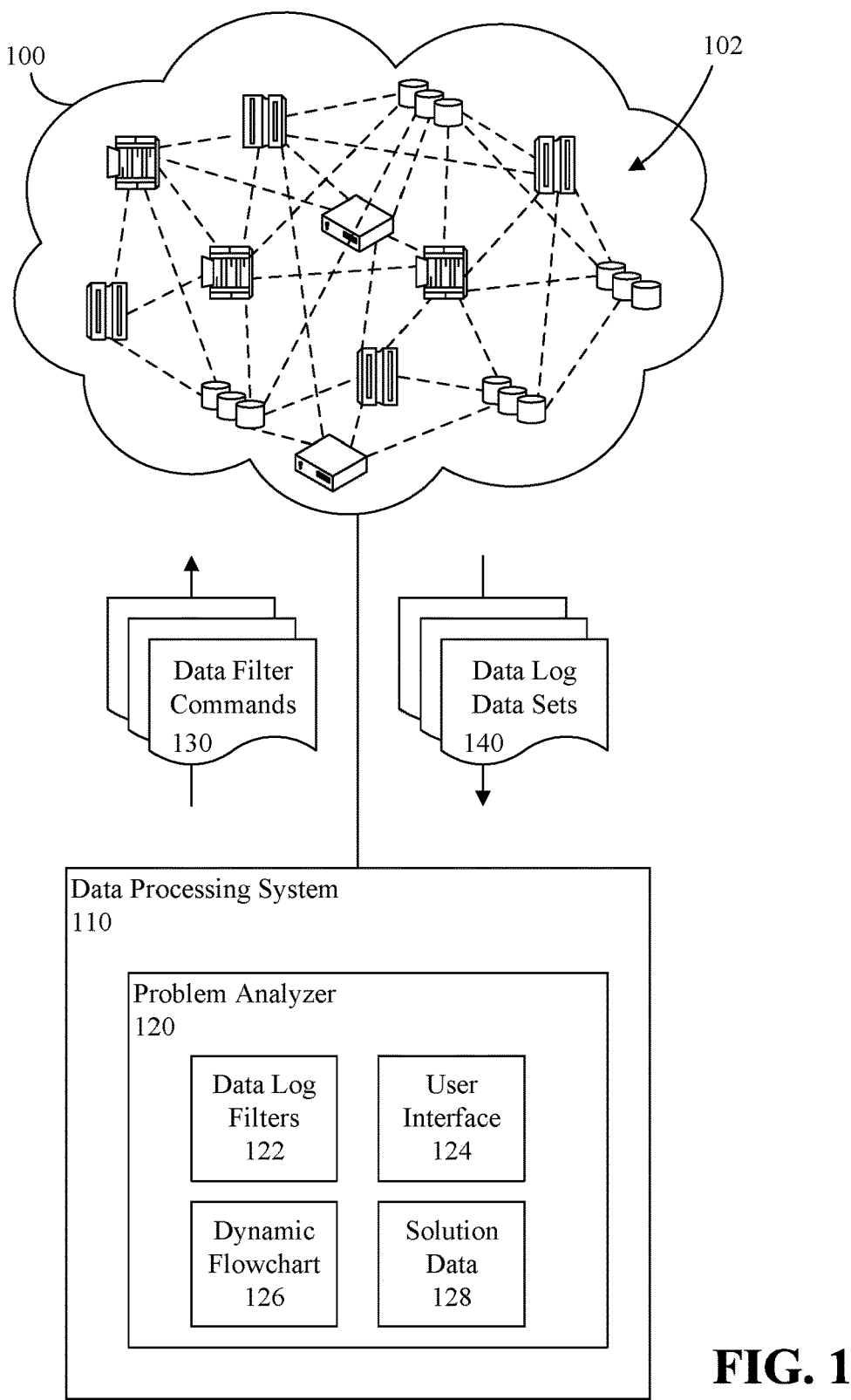
FIG. 1 is a block diagram illustrating an example of a computing environment and a data processing system external to the computing environment.

This disclosure relates to data processing systems, and more specifically, to data processing systems used to analyze problems in computing environments. In accordance with the inventive arrangements disclosed herein, an indication of a problem within a computing environment can be received by a data processing system external to the computing environment. The data processing system can access data sets from data logs of a plurality of electronic devices within the computing environment. The data processing system also can access other information from the electronic devices and/or from one or more other systems external to the computing environment. The data processing system can analyze the data sets and/or other information to determine one or more causes of the problem. The data processing system can output results of such analysis. This can greatly simplify troubleshooting problems in computing environments, and save users significant amounts of time when troubleshooting problems. Moreover, since the system is external to the computing environment, resources of the computing environment are not used to perform the troubleshooting, other than communicating requested log entries. Thus, such resources can continue processing workloads, and such workload processing will not be affected (e.g., slowed down or suspended) while troubleshooting is performed in the computing environment. Further, in one arrangement, the data processing system can automatically implement a solution to the problem, thus automatically correcting the problem. Accordingly, system performance can be improved utilizing the arrangements disclosed herein.

Several definitions that apply throughout this document now will be presented.

As defined herein, the term "computing environment" means a collection of computers, software and one or more networks that support processing and exchange of electronic information.

As defined herein, the term "network infrastructure" means a collection of hardware resources and software resources that enable network connectivity, communication, operations and management of a data communication network.

As defined herein, the term "data processing system" means a system comprising at least one processor and memory configured to process data.

As defined herein, the term "data log" means a functional data structure configure to store data pertaining to operations performed by an electronic device and/or operating conditions of the electronic device.

As defined herein, the term "data set" means at least a portion of data stored by a data log.

As defined herein, the term "problem" means an undesired condition within a computing environment.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real time" means a level of processing responsiveness that a user or system senses as sufficiently immediate for a particular process or determination to be made, or that enables the processor to keep up with some external process.

As defined herein, the term "output" means storing in memory elements, writing to display or other peripheral output device, sending or transmitting to another system, exporting, or similar operations.

As defined herein, the term "automatically" means without user intervention.

As defined herein, the term "user" means a person (i.e., a human being).

FIG. 1 is a block diagram illustrating an example of a computing environment 100 and a data processing system 110 external to the computing environment 100. The computing environment 100 can include a plurality of electronic devices 102. The electronic devices 102 can include computers (e.g., servers, workstations, desktop computers, mobile computers, etc.), network infrastructure components (e.g., switches, routers, modems, firewalls, transceivers, wires, cables, fiber optic cables, etc.), one or more storage area networks (SANs), and so on. As noted, a SAN itself may include servers, host bus adapters (HBAs), SAN switches, virtualization devices (e.g., a SAN volume controllers (SVCs)), wide area network (WAN) communication links, storage devices (e.g., hard disk drives, solid state drives, tape drives, etc.) and storage controllers.

The data processing system 110 can include at least one processor and memory configured to execute computer program code. As noted, the data processing system 110 can be external to the computing environment 100, meaning that the data processing system 110 is completely independent of the computing environment 100 other than a communication link to the computing environment 100 which the data processing system 110 can use to request and receive data sets from data logs of various electronic devices that are members of the computing environment 100. In illustration, the data processing system 110 can use internal storage or other data storage devices/systems that are not members of the computing environment 100. If the data processing system 110 is a member of a domain, that domain can be different from one or more domains hosted in the computing environment 100. For example, the data processing system 110 can be a member of a domain hosted by one or more domain servers external to the computing environment 100.

The data processing system 110 can include a problem analyzer 120. The problem analyzer 120 can be configured to analyze problems within one or more computing environments, such as the computing environment 100. The problem analyzer can include data log filters 122 and a user interface 124. The data log filters 122 can be configured to generate or provide data filter commands 130 used to access data sets 140 from data logs of various electronic devices 102 that are members of the computing environment 100. The data filter commands 130 can be, for example, command line interface (CLI) commands, and can be formatted with arguments (e.g., filters) configured to poll the electronic devices 102 to access specific types of data sets 140 from the data logs of the electronic devices 102, depending on the nature of a problem being analyzed. For example, some arguments may specify data pertaining to health of the electronic devices 102, data pertaining to whether ports are online, offline or degraded, data pertaining to specific types of communication errors (e.g., lost packets, high latency, etc.), and so on. In another example, arguments may specify data pertaining to all issues present in one or more electronic devices 102. In other examples, arguments may specify specific types of data, for instance data pertaining to password length checks, configuration changes, hardware/software failures, etc. Further, data filter commands 130 can be configured to access data sets 140 widely across a large number of the electronic devices 102, or more narrowly to smaller groups of the electronic devices 102, depending on the nature of the identified problem in the computing environment 100. Moreover, the arguments can be configured to query not only current data sets pertaining to electronic devices 102, but also historical data sets pertaining to electronic devices 102. For example, arguments can specify data sets generated over a specific period of time (e.g., over the last hour, the last five hours, the last day, the last week, etc.).

In a further aspect of the present arrangements, data filter commands 130 can be configured to access information from electronic devices 102 that may not be contained in data logs. For example, a host server can include a plurality of ports that are attached to a SAN. Rather than accessing data from data logs of the host server, a data filter command 130 can directly query the host server to receive information indicating the status of the ports, e.g., are they online, offline or degraded. In another example, a data filter command 130 can directly query the host server to receive status information for other components of the host server, configuration information for the host server/components, etc. A data filter command 130 also can query the host server to access other information related to the health of the host server, information indicating available resources and/or allocated resources on the host server, information indicating configuration changes to the host server, information indicating component/software failures, and so on. In one arrangement, a data filter command 130 can query another system (not shown) external to the computing environment 100 to access information related to the host server that may be contained in such other system. Again, data filter commands 130 also can capture historical information, for example information captured over a specific period of time, and the problem analyzer 120 can output the data accessed by the filter commands 130.

The problem analyzer 120 can select the data log filters 122 used to generate the data filter commands 130 based on the nature of the problem being analyzed. To determine the nature of the problem, via the user interface 124, the problem analyzer 120 can present questions relevant to various problems in the computing environment 100 and instructions for answering the questions. A user can answer the questions. Based on the answers, the problem analyzer 120 can determine a nature of the problem, and select corresponding data log filters 122.

The questions that are asked can be defined in a dynamic flowchart 126. As each question is answered, following the dynamic flowchart 126, the problem analyzer 120 can select a next question (e.g., node of the flowchart) based on the answer(s) to one or more previous questions, and present the next question to the user. In this regard, the problem analyzer 120 can follow a particular path in the dynamic flowchart 126 that corresponds to the answers received. At some point, the path will end at a node that indicates a nature of the problem. The node also can indicate specific electronic devices 102, or types of electronic devices 102, that may contribute to, or cause, the problem.

In one arrangement, the dynamic flowchart 126 can be presented to the user via the user interface 124. The dynamic flowchart 126 can indicate different paths that may be taken through the dynamic flowchart 126 based on answers that are provided. Accordingly, the user can see where different answers will lead in the dynamic flowchart 126.

Rather than analyzing one electronic device 102 at a time when troubleshooting a problem in the computing environment 100, the problem analyzer 120 can analyze a plurality of electronic devices 102 simultaneously. For example, assume that there is a plurality of electronic devices 102 that potentially may contribute to, or cause, an identified problem. The problem analyzer can select a first set of those electronic devices 102, and communicate data filter commands 130 to the elected electronic devices 102. In response, the electronic devices 102 can communicate data sets 140 from their respective data logs to the problem analyzer 120. If the data filter commands 130 request information not contained in data logs, the electronic devices 102 also can communicate such information to the problem analyzer 120.

The problem analyzer 120 can analyze the received data sets 140 and/or other received information, and based on such analysis, determine whether one or more of the selected electronic devices 102 may be contributing to, or causing, the problem. If not, the problem analyzer 120 can communicate data filter commands 130 to a second set of the electronic devices 102, and determine whether one or more of the selected electronic devices 102 may be contributing to, or causing, the problem. If so, the problem analyzer 120 can focus on the second set of electronic devices 102. For example, the problem analyzer 120 can split the second set into further subsets of electronic devices 102, and communicate additional data filter commands 130 requesting data sets 140 and/or information that is more detailed than the first round of data filter commands 130 that were communicated. The problem analyzer 120 can iterate this process until the specific electronic device(s) 102 that is/are contributing to, or causing, the problem is/are identified.

Responsive to identifying the specific electronic device(s) 102 that is/are contributing to, or causing, the problem, based on analyzing the data sets 140/information received for the specific electronic device(s) 102, the problem analyzer can determine a solution for correcting the problem. In illustration, the problem analyzer 120 can analyze the data sets 140/information to identify a problem in an electronic device 102, and a severity of the problem. Further, the problem analyzer 120 can access solution data 128 that correlates problems to solutions for correcting the problems. The solution data 128 can be stored in one or more data tables, for instance in a database. The solution data 128 can correlate problems with solutions for various types of electronic device(s) 102 and/or for specific electronic device(s) 102. In the solution data 128, the problem analyzer 120 can identify the specific electronic device 102, or type of electronic device 102, experiencing the problem, identify the problem, and identify the solution corresponding to the problem and the specific electronic device 102 or type of electronic device 102.

Further, by analyzing the data sets 140 and/or other information, the problem analyzer 120 can identify electronic device configurations that deviate from best practices (e.g., preferred configurations), including such configurations that contribute to the identified problem. In illustration, the problem analyzer 120 can identify a configuration of an electronic device 102 that may cause an error or symptom to appear in another electronic device. In illustration, if the data set 140 accessed from a first electronic device 102 indicates an error in data received from another electronic device 102, the problem analyzer 120 can analyze the data set 140 and/or other information accessed from the other electronic device to determine a cause of the data error. Such cause may be an incorrect configuration, which the problem analyzer 120 can identify. For instance, the problem analyzer 120 can compare the configuration settings of the other electronic device 102 to a configuration that is known to implement a best configuration practice for that type of electronic device 102.

Responsive to identifying the solution, the problem analyzer 120 can present to the user, via the user interface 124, an indication of the electronic device(s) 102 experiencing the problem, the cause of the problem, the severity of the problem, and the identified solution to that problem. If the electronic device(s) 102 is/are not configured in accordance with best practices, the problem analyzer 120 also can indicate such, as well as indicate recommended changes to the configuration to conform to the best practices. In addition, via the user interface 124, the problem analyzer 120 can present user selectable links to specific data contained in the received data sets 140 and/or other specific information that indicate the problem. Accordingly, the user can quickly access the pertinent data/information without having to read through all of the data sets 140 and/or other collected information. This can result in a faster implementation of a solution to the problem in comparison to previously known troubleshooting techniques.

Further, via the user interface 124, the problem analyzer 120 can present a user selectable item (e.g., a menu item, button, icon, etc.) the user may select to initiate the problem analyzer 120 to implement, automatically, the solution to correct the problem. For example, the problem analyzer 120 can reconfigure at least one of the electronic devices 102 in accordance with the solution to solve the problem. The reconfiguration can include configuring an electronic device 102 to conform to best practices (e.g., a preferred configuration), disable one or more components that are not properly operating, enable one or more components, and so on. In illustration, if a port of an electronic device 102 is offline, the problem analyzer 120 can communicate to the electronic device 102 one or more commands to enable that port to bring the port online. If a port of an electronic device is degraded, the problem analyzer 120 can communicate to the electronic device 102 one or more commands to take that port offline, and direct communications through one or more other ports. Still, the problem analyzer 120 can communicate commands to one or more electronic devices 102 to implement any other solutions to solve the problem, and the present arrangements are not limited in this regard.

In one arrangement, the solution can be implemented immediately responsive to the user selecting the user selectable item. In another arrangement, responsive to the user selecting the user selectable item, the problem analyzer 120 can present to the user a menu of options from which the user may choose or specify a time when the solution is to be implemented. Responsive to the user selecting or specifying a time, the problem analyzer 120 can schedule the solution to be implemented at that time, and implement the solution when the time arrives.

Figure 2:
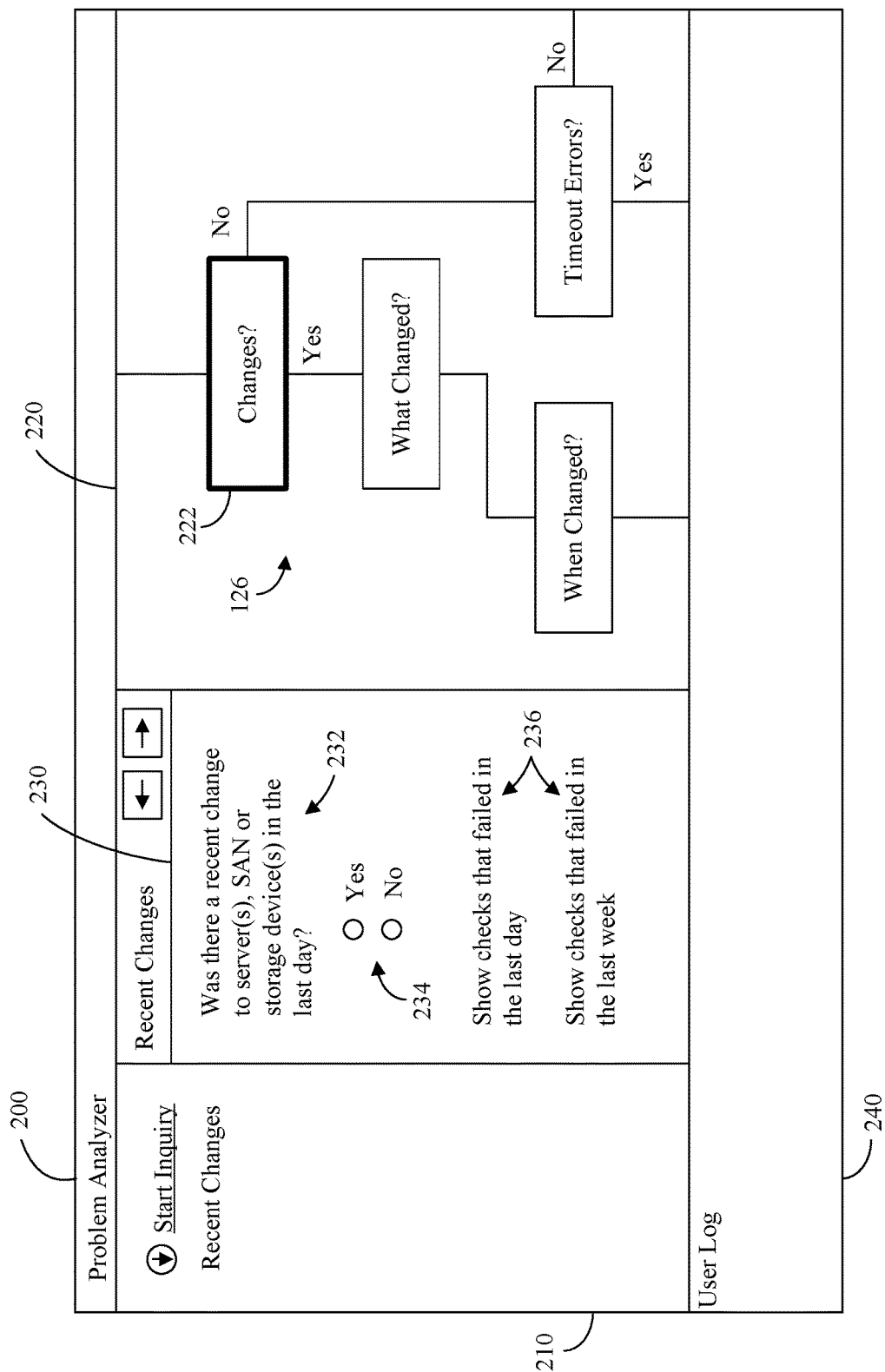
FIG. 2 is an example of a view presented in a user interface by the data processing system.

FIG. 2 is an example of a view 200 presented in the user interface 124 by the data processing system 110 and, more particularly, by the problem analyzer 120. The view 200 can include a pane 210 that automatically tracks actions that are stepped through in the dynamic flowchart 126, presented in a pane 220, in a decision tree process. Such actions can be answers provided to questions asked by the problem analyzer, for example a question 232 presented in a pane 230. The user interface 124 can provide functionality to allow the user to zoom in and zoom out from the dynamic flowchart 126, thus allowing the user to view as much of the dynamic flowchart 126 as the user desires. Further, the user interface 124 can indicate a step 222 in the dynamic flowchart to which the present question 232 pertains, for example by applying a visual effect to the step 222. As noted, the answers provided by the user can be processed by the problem analyzer 120 to determine the nature of the problem to be analyzed.

The view 200 can include in the pane 230 instructions (not shown) that the user may follow to answer the presented questions 232. Further, the view 200 can include in the pane 230 radio buttons 234, icons, menu items or the like for a user to provide the answers. Some questions may require a text input. For such questions, the view 200 can include in the pane 230 a text entry field (not shown) for the user to input answers to a question in text form.

In addition, the view 200 can include in the pane 230 one or more links 236. The links 236 can be user selectable to cause the user interface 124 to present additional information, for example to show checks that failed within a specified time frame. The checks can indicate, for example, hardware and/or software that failed one or more tests performed on the electronic devices 102. In illustration, the links 236 can be initiate the data log filters 122 to initiate communication of data filter commands 130 to access filtered data sets 140 and/or other information from the electronic devices 102 and display exact failures indicated in the data sets 140/information, as well as display issues and actions to help the user answer the proposed question 232. The electronic devices 102 that are selected to receive the data filter commands 130 can be selected based on the particular question 232 being presented and answers previous questions. If the user has already input an answer to the question 232, the selection of the electronic devices 102 also can be based on that answer.

The view 200 also can include a user log pane 240 in which the user can add text, images and/or file attachments as entries in a user log pertaining to a problem solving session using the problem analyzer 120. Such information can be stored by the problem analyzer 120 for review purposes.

Figure 3:
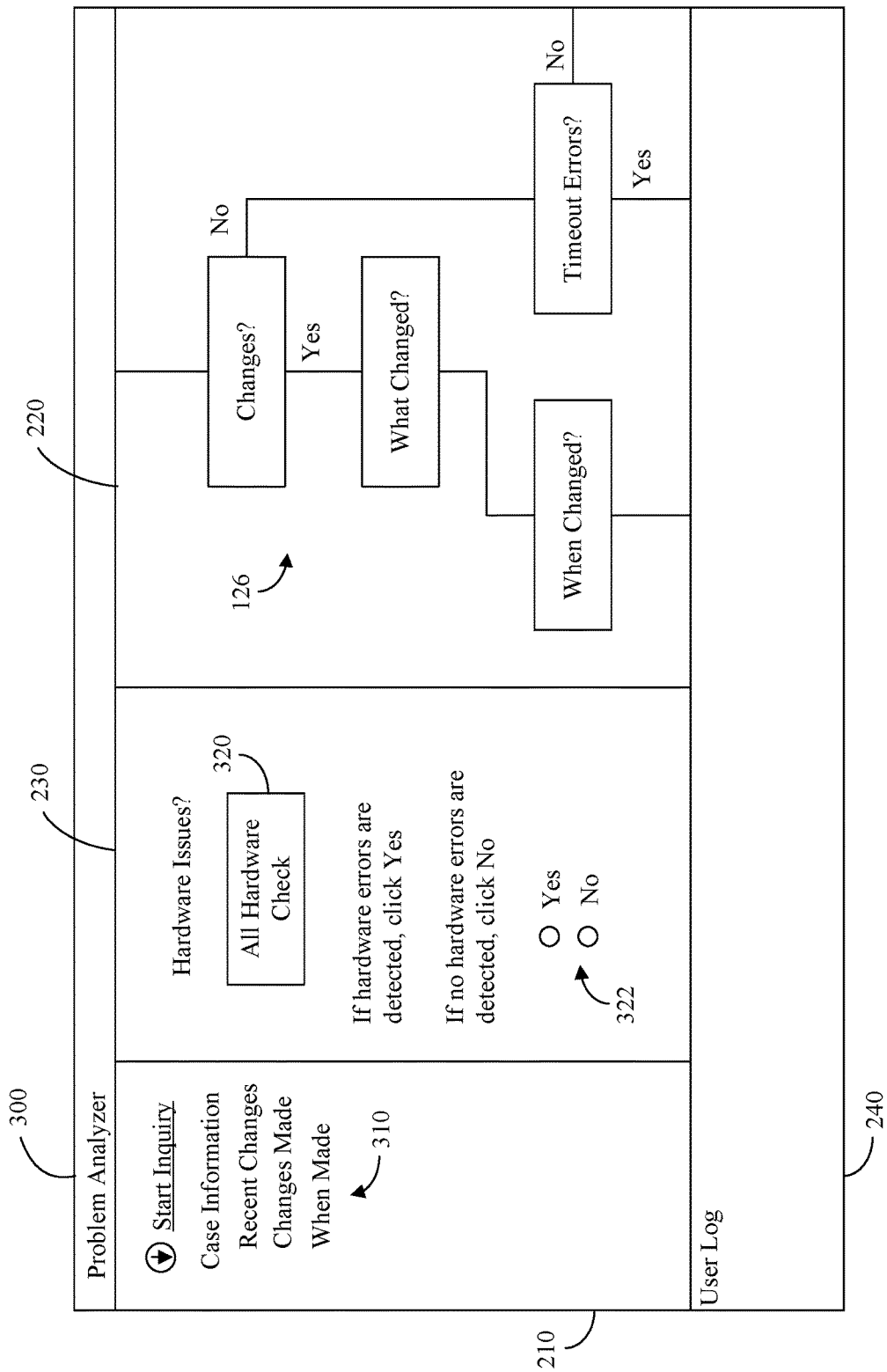
FIG. 3 is another example of a view presented in the user interface by the data processing system.

FIG. 3 is another example of a view 300 presented in the user interface 124 by the data processing system 110 and, more particularly, by the problem analyzer 120. The view 300 can be presented via the user interface 124 responsive to the user completing the questions asked for the dynamic flowchart 126. The view 300 can include the panes 210, 220, 230 and 240.

In the view 300, the pane 210 can be updated to indicate case information 310 for the current problem analysis. Such case information can be based on answers to the questions asked. The user can select portions of the case information 310 to change focus of the dynamic flowchart 126 to the portions of the dynamic flowchart 126 corresponding to the selected portions of the case information 310. Accordingly, the user can review answers to questions, and view the impact of those answers on the path propagated through the dynamic flowchart 126. Further, the user can change one or more answers. Responsive to a user selecting to change an answer, the problem analyzer 120 can again present the view 200 to guide the user through the dynamic flowchart 126 with appropriate questions responding to the user's answers.

The pane 230 can be updated to present an option, for example a button 320, menu item, etc., for the user to initiate an all hardware check. Responsive to the user selecting the option (e.g., selecting the button 320), the problem analyzer 120 can initiate the data log filters 122 to communicate data filter commands 130 to the electronic devices 102. As noted, the data filter commands 130 can be communicated recursively to sets and sub sets of the electronic devices 102 to identify one or more electronic devices 102 that contribute to the identified problem. All of the electronic devices 102 may receive and respond to initial data filter commands 130. In one arrangement, as noted, subsequent data filter commands 130 to access finer detailed information can be communicated to sets and subsets of the electronic devices 102 to narrow in on the actual problem.

In the view 300, the pane 230 also can include radio buttons 322, icons, menu items or the like for a user to indicate whether hardware errors are detected. By way of example, the data sets 140 may not indicate a hardware error being detected. In such case, the user can select the "No" radio button 322. If the user knows of a hardware error that was not detected, the user can enter descriptive information relating to the hardware error in the user log 240. In another example, the data sets 140 may indicate a particular hardware error not recognized by the problem analyzer 120. In such case, the user can select the "Yes" radio button 322 to indicate that a hardware error exists. Further, the user can add information to the user log 240 indicating that the hardware error was not recognized by the problem analyzer 120. In yet another example, the data sets 140 may indicate a hardware error that is recognized by the problem analyzer 120. In such case, the user can select the "Yes" radio button 322 to indicate that a hardware error exists. Further, the user can add descriptive information relating to the hardware error in the user log 240.

FIG. 4 is another example of a view 400 presented in the user interface 124 by the data processing system 110 and, more particularly, by the problem analyzer 120. The view 400 can include information resulting from the analysis of the data sets 140 and/or other information. In illustration, the view 400 can present one or more issues 410 that may contribute to the identified problem. Each issue 410 presented in the view 400 can be a result of analyzing a particular data set 140 from a particular electronic device 102 and/or other information received from the electronic device 102.

For each issue 410, the view 400 can include a plurality of fields 420, 422, 424, 426, 428, 430, 432, 434, 436. The field 420 can include a link to further information about the issue. For example, the field can provide a link to data sets 140 and/or other information related to the issue, for the particular electronic device 102 indicated in the field 430, as depicted in FIG. 5. The field 422 can present an identifier indicating a particular response to a request for data sets 140 or other information from the particular electronic device 102 indicated in the field 430. The field 424 can indicate a "check name." The check name can be summary of at least one issue that is a candidate contributor to the problem within the computing environment 100. The summary can be generated based on an analysis of the data set 140 received from the electronic device 102 and/or other information related to the electronic device 102. In this regard, the data set 140 and/or other information can indicate the issue.

The field 426 can indicate a severity of an issue indicated in the field 424. The field 428 can indicate a result of an analysis of the electronic device 102 indicated in the field 430 pertaining to the issue 410. The field 430 can indicate the electronic device 102 to which the issue 410 pertains. The field 432 can indicate whether compliance of the electronic device 102 with one or more standards (e.g., best practices) is affected by the issue 410. The field 434 can indicate how long since the electronic device 102 exhibited the result indicated in field 428. For example, if the data logs of the electronic device 102 indicate a condition causing a failure as determined by the analysis, the field 434 can indicate how long that condition has persisted. The field 436 can indicate a suspicion of the cause of the failure. The suspicion of the cause of the failure can be determined by the problem analyzer 120 by analyzing the data sets 140 and/or other information received from the electronic device 102.

FIG. 5 is another example of a view 500 presented in the user interface 124 by the data processing system 110 and, more particularly, by the problem analyzer 120. The view 500 can be presented responsive to the user selecting a particular issue 410, or selecting a link in the field 420 of FIG. 4. In this regard, the user input can select a result of analyzing a particular data set and/or other information. The view 500 can represent summaries of issues indicated in the data sets 140 and/or other information that are candidate contributors to the problem within the computing environment.

The view 500 can indicate information 510 pertaining to the issue, as well as a data 520 received from the subject electronic device 102 (indicated in field 430 of FIG. 4) pertaining to the issue. The data 520 can be a complete data set 140, or a portion of a data set 140 determined by the problem analyzer 120 as being most pertinent to the issue. In one non limiting arrangement, the data 520 can include other information received from the electronic device 102, but not included in a data log. A user can review the data 520 to formulate an understanding of the issue, and take any actions that may be required to correct the issue. As noted, the problem analyzer 120 can automatically to implement a solution to correct the problem caused by, or contributed to, by the issue. Nonetheless, the user can review the data 520 to determine whether the user chooses to initiate such solution. Additional views similar to the view 500 can be presented responsive to the user selecting other particular issues 410, or selecting other links in the field 420 of FIG. 4.

Figure 6:
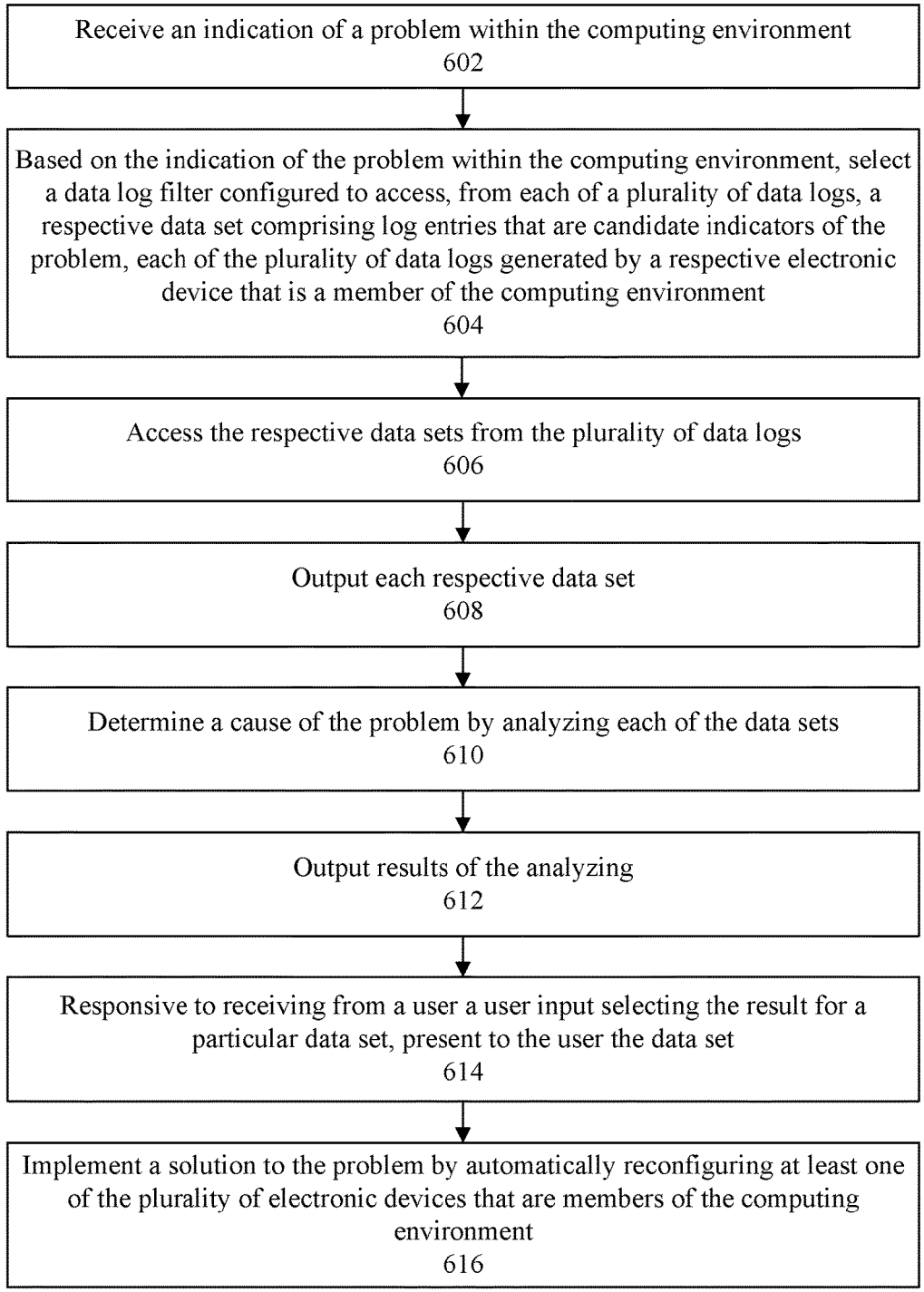
FIG. 6 is a flow chart illustrating an example of a method of analyzing a problem in a computing environment.

FIG. 6 is a flow chart illustrating an example of a method 600 of analyzing a problem in a computing environment. At step 602, the problem analyzer 120 can receive an indication of a problem within the computing environment 100. As noted, the problem analyzer 120 can be a component of a data processing system 110 that is external to the computing environment 100. In one arrangement, the indication of the problem within the computing environment 100 can be determined, at least in part, by receiving answers from a user to questions regarding the computing environment. The questions regarding the computing environment can be defined in the dynamic flowchart 126. The dynamic flowchart 126 can be presented to the user and indicate different paths that may be taken through the dynamic flowchart 126 based on answers that are provided by the user.

At step 604, the problem analyzer 120 can, based on the indication of the problem within the computing environment 100, select a data log filter 122 configured to access a respective data set 140 pertinent to the problem from each of a plurality of data logs, each of the plurality of data logs generated by a respective electronic device 102 that is a member of the computing environment 100. At step 606, the problem analyzer 120 can access the respective data sets 140 from the plurality of data logs. At step 608, the problem analyzer 120 can output each respective data set.

At step 610, the problem analyzer 120 can determine a cause of the problem by analyzing each of the data sets 140. At step 612, the problem analyzer 120 can output results of the analyzing. The result of the analyzing for at least one of the data sets 140 can include a summary at least one issue indicated in the data set that is a candidate contributor to the problem within the computing environment 100. For example, the result of the analyzing can indicate a severity of the at least one issue. At step 614, responsive to receiving from a user a user input selecting the result for a particular data set, the problem analyzer 120 can present to the user at least a portion of the data set 140. At step 616, the problem analyzer 120 can automatically implement a solution to the problem by reconfiguring at least one of the plurality of electronic devices 102.

Figure 7:
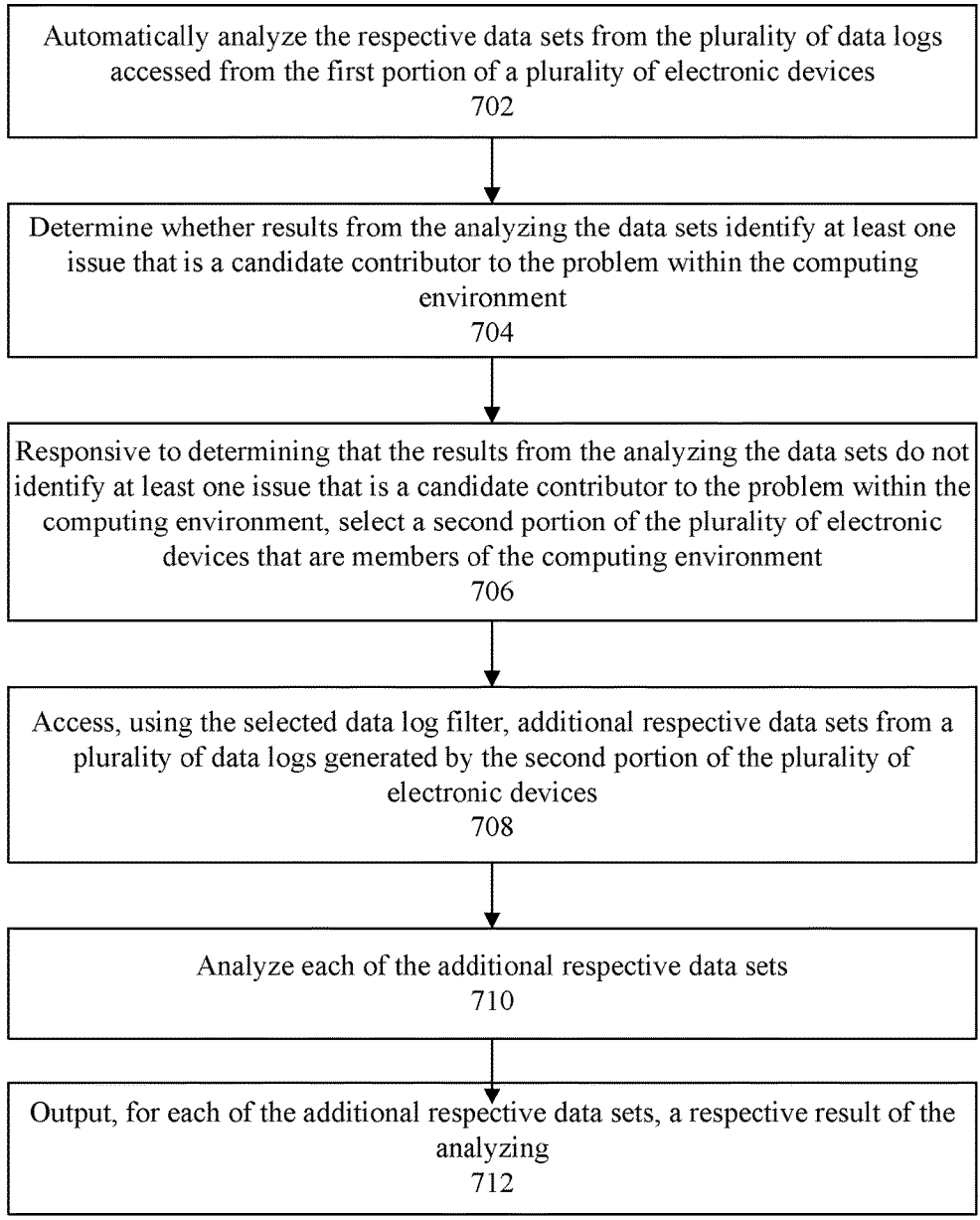
FIG. 7 is another flow chart illustrating an example of a method of analyzing a problem in a computing environment.

FIG. 7 is another flow chart illustrating an example of a method 700 of analyzing a problem in a computing environment. The method 700 can be incorporated with the method 600 of FIG. 6. In the method 700, the respective data sets 140 from the plurality of data logs can be accessed from a first portion of a plurality of electronic devices 102 that are members of the computing environment 100.

At step 702, the problem analyzer 120 can determine whether the results from the analyzing the data sets 140 identify at least one issue that is a candidate contributor to the problem within the computing environment 100. At step 704, the problem analyzer 120 can, responsive to determining that the results from the analyzing the data sets 140 do not identify at least one issue that is a candidate contributor to the problem within the computing environment 100, select a second portion of the plurality of electronic devices 102 that are members of the computing environment 100. At step 706, the problem analyzer 120 can access, using the selected data log filter 122, additional respective data sets 140 from a plurality of data logs generated by the second portion of the plurality of electronic devices 102. At step 708, the problem analyzer 120 can analyze each of the additional respective data sets 140. At step 710, the problem analyzer 120 can output, for each of the additional respective data sets 140, a respective result of the analyzing.

Figure 8:
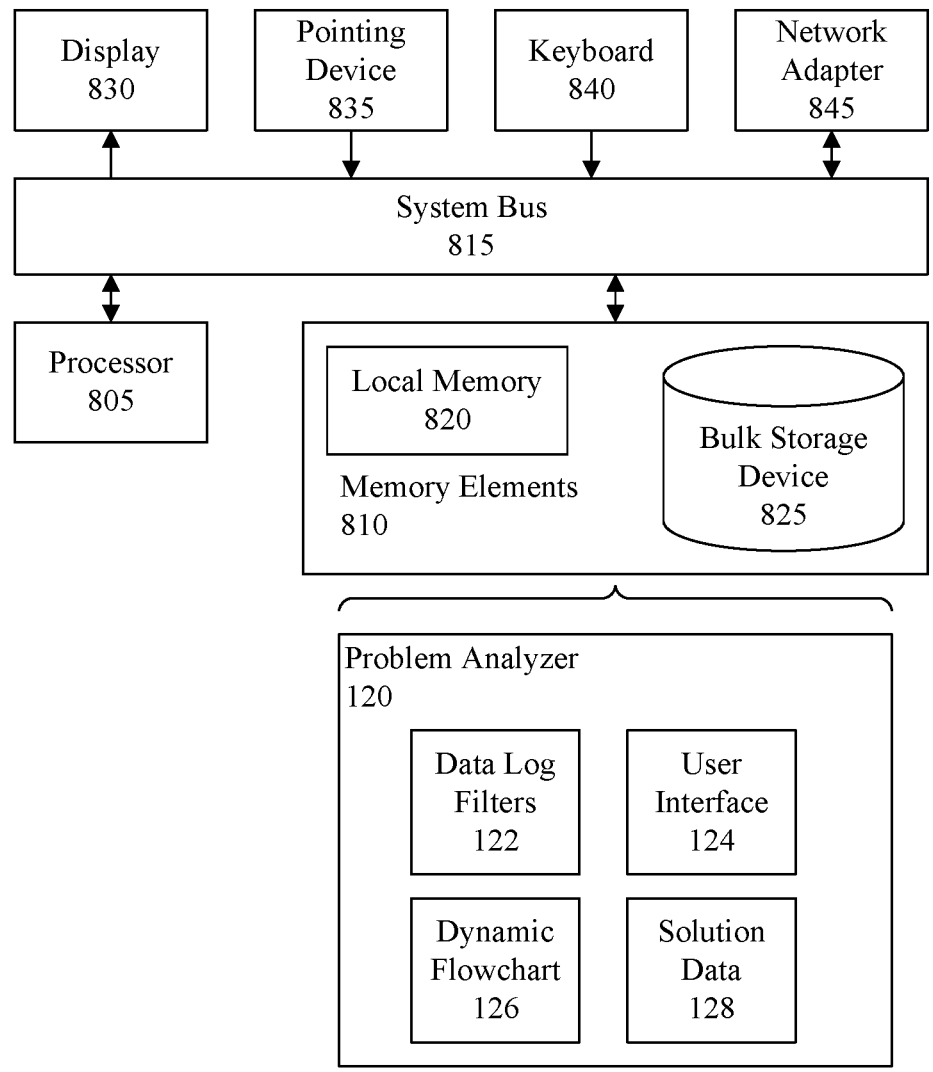
FIG. 8 is a block diagram illustrating example architecture for the data processing system.

FIG. 8 is a block diagram illustrating example architecture for the data processing system 110 of FIG. 1. The data processing system 110 can include at least one processor 805 (e.g., a central processing unit) coupled to memory elements 810 through a system bus 815 or other suitable circuitry. As such, the data processing system 110 can store program code within the memory elements 810. The processor 805 can execute the program code accessed from the memory elements 810 via the system bus 815. It should be appreciated that the data processing system 110 can be implemented in the form of any system including a processor and memory that is capable of performing the functions and/or operations described within this specification. For example, the data processing system 110 can be implemented as a server, a plurality of communicatively linked servers, a workstation, a desktop computer, a mobile computer, a tablet computer, a laptop computer, a netbook computer, a smart phone, a personal digital assistant, and so on.

The memory elements 810 can include one or more physical memory devices such as, for example, local memory 820 and one or more bulk storage devices 825. Local memory 820 refers to random access memory (RAM) or other non-persistent memory device(s) generally used during actual execution of the program code. The bulk storage device(s) 825 can be implemented as a hard disk drive (HDD), solid state drive (SSD), or other persistent data storage device. The data processing system 110 also can include one or more cache memories (not shown) that provide temporary storage of at least some program code in order to reduce the number of times program code must be retrieved from the bulk storage device 825 during execution.

Input/output (I/O) devices such as a display 830, a pointing device 835 and, optionally, a keyboard 840 can be coupled to the data processing system 110. The I/O devices can be coupled to the data processing system 110 either directly or through intervening I/O controllers. For example, the display 830 can be coupled to the data processing system 110 via a graphics processing unit (GPU), which may be a component of the processor 805 or a discrete device. One or more network adapters 845 also can be coupled to data processing system 110 to enable the data processing system 110 to become coupled to other systems, computer systems, remote printers, and/or remote storage devices through intervening private or public networks. Modems, cable modems, transceivers, and Ethernet cards are examples of different types of network adapters 845 that can be used with the data processing system 110.

As pictured in FIG. 8, the memory elements 810 can store the components of the data processing system 110, namely the problem analyzer 120, including the data log filters 122, the user interface 124, the dynamic flowchart 126 and the solution data 128. Being implemented in the form of executable program code, these components of the data processing system 110 can be executed by the data processing system 110 and, as such, can be considered part of the data processing system 110. Moreover, data log filters 122, user interface 124, dynamic flowchart 126 and solution data 128 are functional data structures that impart functionality when employed as part of the data processing system 110.

While the disclosure concludes with claims defining novel features, it is believed that the various features described herein will be better understood from a consideration of the description in conjunction with the drawings. The process (es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," or similar language means that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a processor programmed to initiate executable operations comprising:
   receiving, by a data processing system external to a computing environment, an indication of a problem within the computing environment;
   based on the indication of the problem within the computing environment, selecting by the data processing system, a data log filter configured to access, from each of a plurality of data logs, a respective data set comprising log entries that are candidate indicators of the problem, each of the plurality of data logs generated by a respective electronic device that is a member of the computing environment;

accessing, by the data processing system using the selected data log filter, the respective data sets from the plurality of data logs, wherein the respective data sets from the plurality of data logs are accessed from a first portion of a plurality of electronic devices that are members of the computing environment;

outputting each respective data set;

automatically analyzing the respective data sets from the plurality of data logs accessed from the first portion of a plurality of electronic devices;

determining whether results from the analyzing indicates at least one issue that is a candidate contributor to the problem within the computing environment;

responsive to determining that the results from the analyzing do not identify at least one issue that is a candidate contributor to the problem within the computing environment, selecting a second portion of the plurality of electronic devices that are members of the computing environment;

accessing, by the data processing system using the selected data log filter, additional respective data sets from a plurality of data logs generated by the second portion of the plurality of electronic devices;

automatically analyzing each of the additional respective data sets; and outputting, for each of the additional respective data sets, a respective result of the analyzing.

2. The system of claim 1, the executable operations further comprising:
implementing a solution to the problem by automatically reconfiguring at least one of a plurality of electronic devices that are members of the computing environment.

3. The system of claim 1, wherein:
the indication of the problem within the computing environment is determined, at least in part, by receiving answers from a user to questions regarding the computing environment;
the questions regarding the computing environment are defined in a dynamic flowchart; and
the dynamic flowchart is presented to the user and indicates different paths that may be taken through the dynamic flowchart based on answers that are provided by the user.

4. The system of claim 1, the executable operations further comprising:
creating a summary of the log entries that are candidate indicators of the problem by automatically analyzing the log entries that are candidate indicators of the problem; and
outputting the summary of the log entries that are candidate indicators of the problem.

5. The system of claim 1, the executable operations further comprising:
determining a severity of the problem by automatically analyzing the log entries that are candidate indicators of the problem; and
outputting at least one indicator indicating the severity of the problem.

6. The system of claim 1, the executable operations further comprising:

accessing, by the data processing system, other information related to a health of the electronic device; and
outputting the other information related to the health of the electronic device.

7. A computer program product comprising a computer readable storage medium having program code stored thereon, the program code executable by a processor to perform a method comprising:
receiving, by a data processing system external to a computing environment, an indication of a problem within the computing environment;
based on the indication of the problem within the computing environment, selecting by the data processing system, a data log filter configured to access, from each of a plurality of data logs, a respective data set comprising log entries that are candidate indicators of the problem, each of the plurality of data logs generated by a respective electronic device that is a member of the computing environment;
accessing, by the data processing system using the selected data log filter, the respective data sets from the plurality of data logs, wherein the respective data sets from the plurality of data logs are accessed from a first portion of a plurality of electronic devices that are members of the computing environment;
outputting, by the data processing system, each respective data set; and
automatically analyzing the respective data sets from the plurality of data logs accessed from the first portion of a plurality of electronic devices;
determining whether results from the analyzing indicates at least one issue that is a candidate contributor to the problem within the computing environment;
responsive to determining that the results from the analyzing do not identify at least one issue that is a candidate contributor to the problem within the computing environment, selecting a second portion of the plurality of electronic devices that are members of the computing environment;
accessing, by the data processing system using the selected data log filter, additional respective data sets from a plurality of data logs generated by the second portion of the plurality of electronic devices;
automatically analyzing each of the additional respective data sets; and
outputting, for each of the additional respective data sets, a respective result of the analyzing.

8. The computer program product of claim 7, the method further comprising:
implementing a solution to the problem by automatically reconfiguring at least one of a plurality of electronic devices that are members of the computing environment.

9. The computer program product of claim 7, wherein:
the indication of the problem within the computing environment is determined, at least in part, by receiving answers from a user to questions regarding the computing environment;
the questions regarding the computing environment are defined in a dynamic flowchart; and
the dynamic flowchart is presented to the user and indicates different paths that may be taken through the dynamic flowchart based on answers that are provided by the user.

10. The computer program product of claim 7, the method further comprising:

creating a summary of the log entries that are candidate indicators of the problem by automatically analyzing the log entries that are candidate indicators of the problem; and outputting the summary of the log entries that are candidate indicators of the problem.

11. The computer program product of claim 7, the method further comprising:

determining a severity of the problem by automatically analyzing the log entries that are candidate indicators of the problem; and outputting at least one indicator indicating the severity of the problem.

12. The computer program product of claim 7, the method further comprising:

accessing, by the data processing system, other information related to a health of the electronic device; and outputting the other information related to the health of the electronic device.

* * * * *